United States Patent [19]
O'Brien

[11] Patent Number: 5,810,451
[45] Date of Patent: Sep. 22, 1998

[54] TRACTION DEVICE FOR VEHICLE WHEELS

[76] Inventor: John Michael O'Brien, 9385 SW. Iowa Dr., Tualatin, Oreg. 97062

[21] Appl. No.: 909,302

[22] Filed: Aug. 11, 1997

Related U.S. Application Data

[63] Continuation-in-part of Ser. No. 733,676, Oct. 17, 1996, Pat. No. 5,788,335.

[51] Int. Cl.⁶ ........................................................ B60B 15/00
[52] U.S. Cl. ............................. 301/45; 152/210; 301/40.1
[58] Field of Search .................................. 301/38.1, 40.1, 301/39.1, 41.1, 43, 45, 46; 152/210, 211

[56] References Cited

U.S. PATENT DOCUMENTS

| | | |
|---|---|---|
| 2,079,501 | 5/1937 | Gallagher . |
| 2,174,944 | 10/1939 | Leggett . |
| 2,201,632 | 5/1940 | Roessel . |
| 2,241,849 | 5/1941 | Fuchs . |
| 2,254,318 | 9/1941 | Roessel . |
| 2,377,923 | 6/1945 | Cawley . |
| 2,559,721 | 7/1951 | Kruse . |
| 2,638,384 | 5/1953 | Colin . |
| 2,751,959 | 6/1956 | Blomquist . |
| 2,765,199 | 10/1956 | Partin . |
| 2,903,037 | 9/1959 | Palmer . |
| 3,995,909 | 12/1976 | van der Lely . |
| 4,676,289 | 6/1987 | Yi Su . |
| 5,411,070 | 5/1995 | Yadegar . |
| 5,609,700 | 3/1997 | West . |

FOREIGN PATENT DOCUMENTS

| | | |
|---|---|---|
| 0 236 041 | 9/1987 | European Pat. Off. . |
| 723612 | 1/1932 | France . |
| 1.006.702 | 6/1954 | France . |
| 83 19992 | 6/1985 | France . |
| 198148 | 6/1958 | Germany . |
| 29 01 606 | 7/1980 | Netherlands . |
| 30 01 483 | 7/1981 | Netherlands . |

Primary Examiner—Russell D. Stormer
Attorney, Agent, or Firm—Robert L. Harrington

[57] ABSTRACT

A traction device for vehicle wheels has tread segments that are expandable and contractible by secondary inflatable chambers to place studs either in engagement or out of engagement with a road surface. Alternatively, stud bearing tread segments are removably mounted between segments of conventional tread.

4 Claims, 8 Drawing Sheets

TRACTION DEVICE FOR VEHICLE WHEELS

This is a continuation-in-part of the patent application filed Oct. 17, 1996, Ser. No. 08/733,676, now U.S. Pat. No. 5,788,335. The disclosure of this pending application is fully incorporated by reference into the present disclosure.

FIELD OF THE INVENTION

This invention relates to a traction device mounted to a vehicle wheel and is selectively convertible to road engaging and non-road engaging positions.

BACKGROUND OF THE INVENTION

This invention is most applicable for vehicles that are driven on roads that can become covered with snow or ice. Whereas such conditions are most commonly associated with colder regions, e.g., the northern states in the United States, the higher mountainous cold weather regions extend substantially across the entire country. Persons who travel extensively will invariably encounter snow laden and/or icy road conditions from time to time. Yet the vast majority of travel is far more likely to occur on dry road conditions.

The conventional wheel tire provides a road contacting surface area that frictionally grips a dry or even wet road surface providing steering and stopping control as well as propulsion over the road surface, but not when that surface is covered with ice and/or snow. The conventional tire surface has poor frictional gripping capability when riding on snow or ice. Whereas several explanations can be given depending on the condition of the ice/snow, what can and often does happen is that the surface of the snow or ice liquefies and forms a liquid film between the tires and underlying surface, thereby reducing the opportunity for the tire to grip the surface frictionally.

An answer to this dilemma is to provide the tire with metal studs or chains. The studs are embedded in the tire permanently and the chains are designed to be placed on the tire when needed and removed when not needed. In both cases, the projecting metal bites down through the snow or ice (and liquid film) to generate the desired gripping action. Both have problems. Studded tires tear up a dry road surface, i.e., when not covered with snow or ice and most states have strict rules about using them. Most states ban their use except during the harsh winter months. Tire chains are designed to be put on and taken off as needed. However, mounting the chains onto the vehicle tires is an unpleasant task even in ideal conditions which most often is not the case. Weather conditions are likely uncomfortably cold and blustery. Mounting the chains onto the tires can take upwards to an hour or more, and when parked alongside an ice-covered roadway and probably on a graded road, the driver is exposed to potential life threatening risks as other unchained vehicles attempt to pass.

The invention of applicant's parent application Ser. No. 08/733,676 alleviates or obviates the problems associated with studded tires and tire chains. The disclosure teaches a separate studded tire sandwiched between dual tires. The studded tire is designed to expand in circumference when inflated and to contract in circumference when deflated. This is achieved in part by the opposing walls of the dual tires that restrict lateral or axial expansion of the studded tire, thus forcing expansion circumferentially or radially. The expansion characteristics of the tire are designed to provide a circumferential size difference so that when deflated, the tire periphery (circumference) is retracted radially inwardly of the dual tires and when inflated is extended radially outwardly of the dual tires.

The studded tire is not intended to carry the vehicle weight. Essentially the stud portions only of the tire protrude and are projected into the ice or snow, e.g., to a depth at which the dual tires still engage the road surface and support the load. The studs provide gripping action for propelling (or stopping) the vehicle as the studded tire rotates in unison with the dual tires, e.g., the studded tire is mounted on the same tire lugs and the expansion of the studded tire against the opposing side walls, rubber to rubber, resists rotative slippage of the studded tire relative to the load-bearing dual tires.

The studded tire is provided with valving and an air pressure source. The air pressure source may be operated automatically and remotely with direct connection between the air pressure source and the studded tire, or the air source may be an air-pressurized cannister that can be clamped to the valving for inflating the tire. Deflation is enabled, e.g., by a valve mechanism that simply exhausts the air from the studded tire to the atmosphere.

Ideally the inflation/deflation will be accomplished automatically from the driver's position even without the necessity of stopping the vehicle. The less sophisticated embodiment will allow the driver to stop the vehicle and in a matter of a few minutes inflate the several studded tires in a fraction of the time previously allotted for mounting tire chains.

BRIEF DESCRIPTION OF THE PRESENT INVENTION

The present invention is specifically directed to the provision of retractable studs for a single tire (as differentiated from dual tires) but based substantially on the concept of the prior application. A special single tire is produced which provides conventional (non-studded) tread portions which are separated on the tire's periphery and a studded tire segment is provided between the separated tread portions. Air pressure is separately provided to the studded tire segment. In the preferred embodiment, the studded tire segment is inflated and deflated to expose and retract the studs. In an alternate embodiment, it is the conventional tread portions that are deflated and inflated to achieve the same result.

Reference is now made to the detailed description and drawings referred to therein for a more thorough understanding of the invention.

DESCRIPTION OF THE PREFERRED EMBODIMENT

Figure 1:
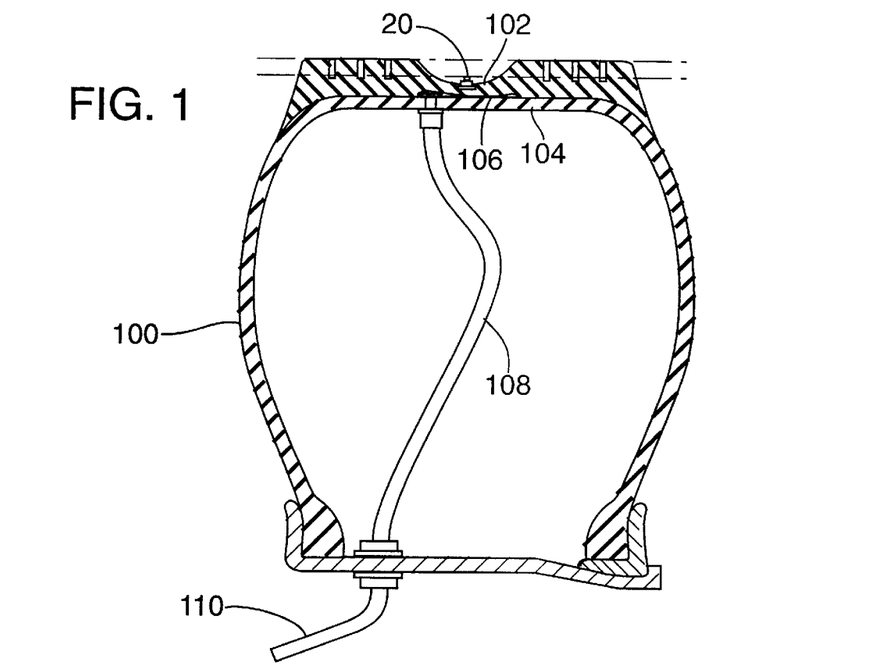
FIGS. 1 and 2 are views of a traction device as applied to a single wheel in accordance with the present invention.
Figure 2:
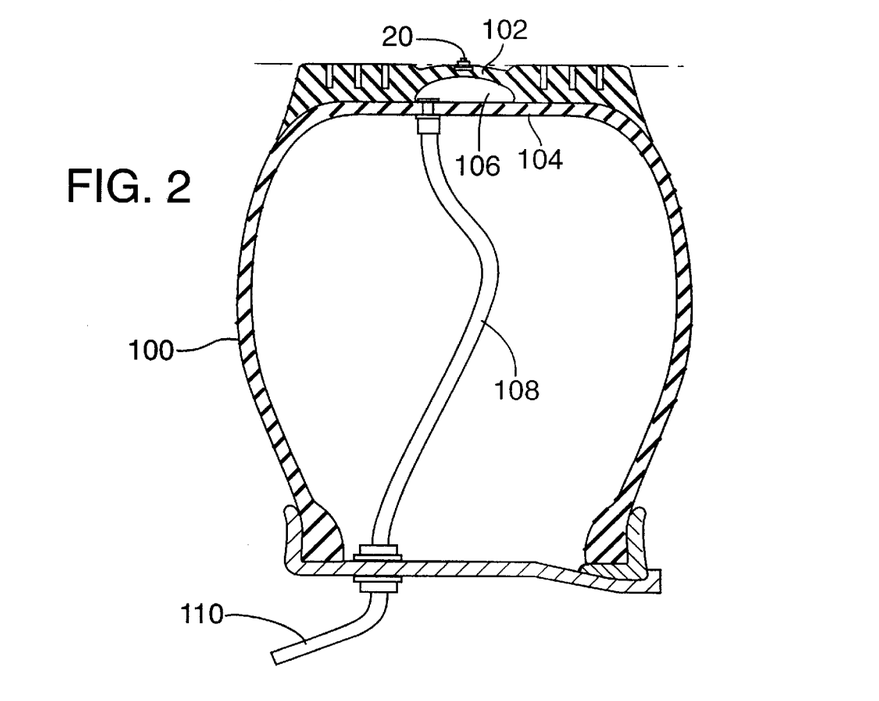

FIGS. 1 and 2 of the drawings illustrate a traction device applied to a single wheel 100. Studs 20 are provided at spaced intervals along the center of the tread portion 102. The center tread portion 102 in combination with the tire wall 104 forms an expandable chamber 106 as shown in FIG. 2. A hose 108 connects the chamber 106 to a valve stem 110 (valve mechanism) to permit applying air pressure to the chamber 106 or relieving air pressure from the chamber 106. Air pressure is applied by a known air source, either remote or self contained on the vehicle. The chamber 106 is shown in the expanded state in FIG. 2 which forces the center tread portion 102 outwardly with reference to the wheel 100 to thus place the studs 20 into engagement with the ground surface. FIG. 1 shows the chamber 106 collapsed. That is, the air has been released from the chamber 106 and the natural resilience of the center tread portion 102 retracts the studs 20 inwardly toward the tire wall 104.

Figure 3:
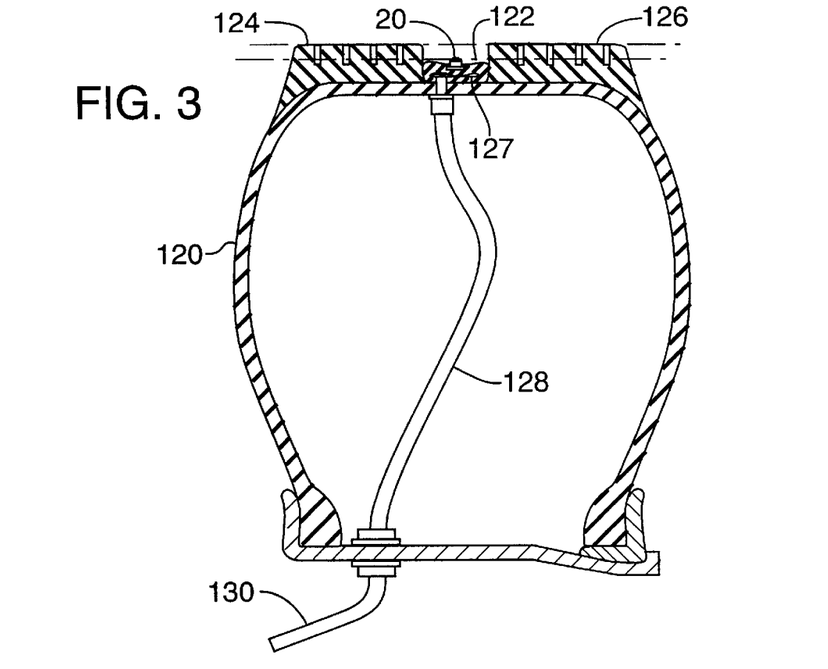
FIGS. 3 and 4 are views illustrating another embodiment of the present invention.
Figure 4:
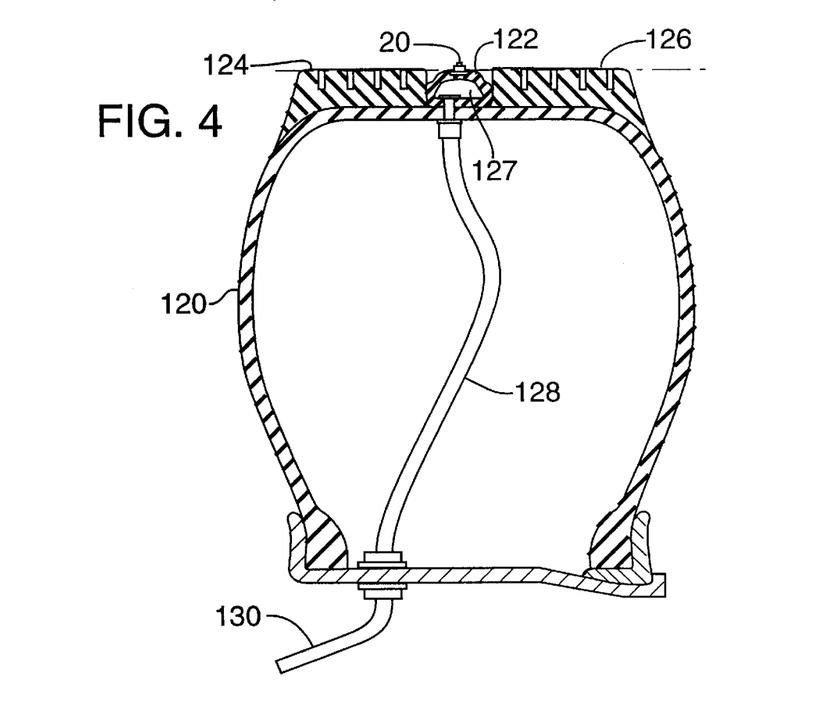

FIGS. 3 and 4 illustrate another traction device applied to a wheel 120. A center tread portion 122 is provided between the side treads 124 and 126. Studs 20 are provided at spaced intervals along the center tread portion 122. The center tread portion 122 is expandable as shown in FIG. 4 and is contractible as shown in FIG. 3. The center tread portion 122 is expanded by the application of air pressure to a chamber 127 formed within the center tread portion 122 and is contractible by releasing the air from the chamber 127. A hose 128 couples the chamber 127 to a valve stem 130. The center tread portion 122 in the expanded state as is shown in FIG. 4 places the studs 20 in contact with the road surface to provided added traction.

Figure 5:
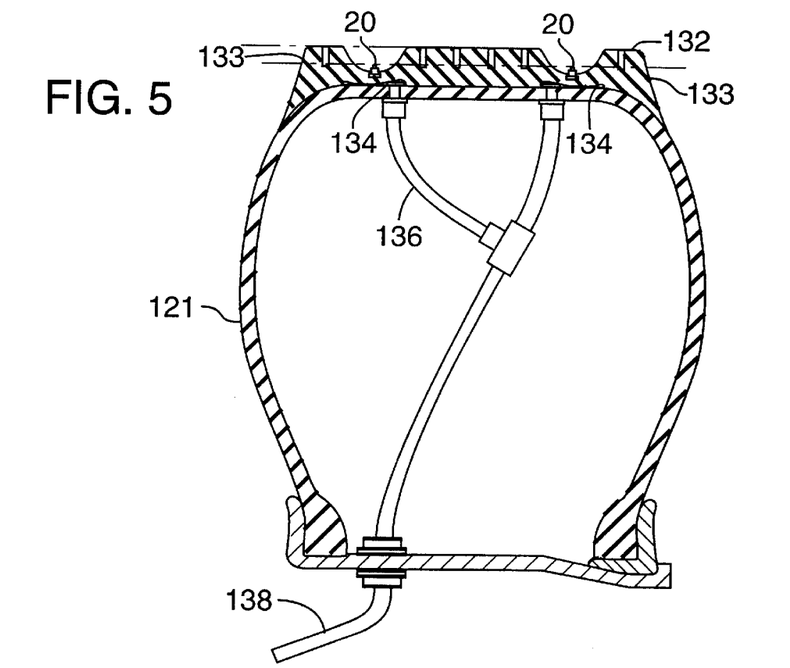
FIGS. 5 and 6 are views of a further embodiment wherein a traction device is applied to a single wheel.
Figure 6:
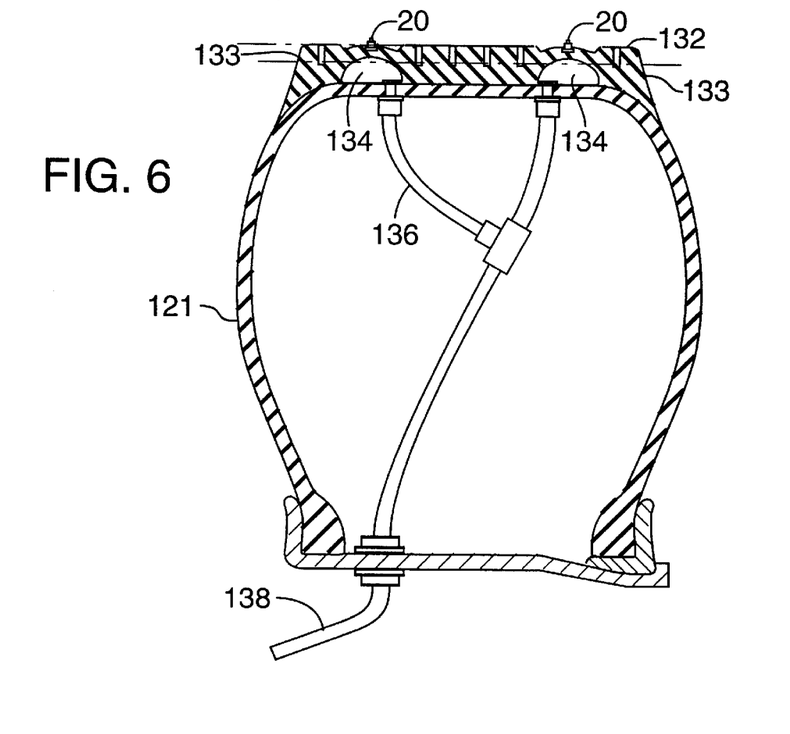

FIGS. 5 and 6 illustrate a traction device similar to those of FIGS. 1 and 2 except that in FIGS. 5 and 6 studs 20 are provided near each side edge 133 of the tire tread 132 on the wheel 121. An expandable chamber 134 is provided for each row of studs 20. A hose 136 couples each of the chambers 134 to a valve stem 138. The chambers 134 are expandable as shown in FIG. 6 and are contractible as shown in FIG. 5. The chambers 134 are expanded by applying air pressure to the chambers 134 and the chambers 134 are contracted by releasing the air from the chambers 134. When the chambers 134 are expanded, the studs 20 are moved radially outward to contact the road surface.

Figure 7:
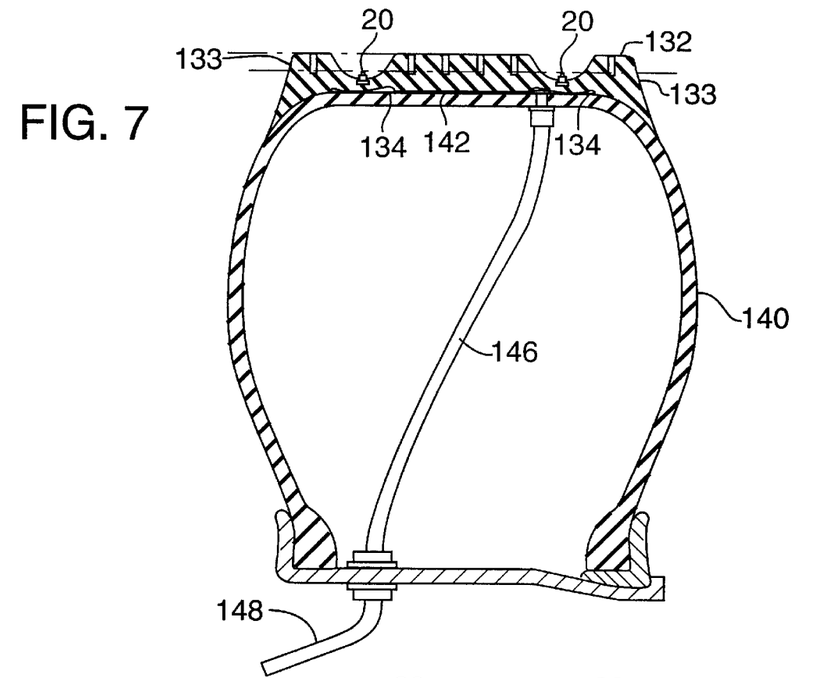
FIGS. 7 and 8 are views of a still further embodiment of a traction device as applied to a single wheel.
Figure 8:
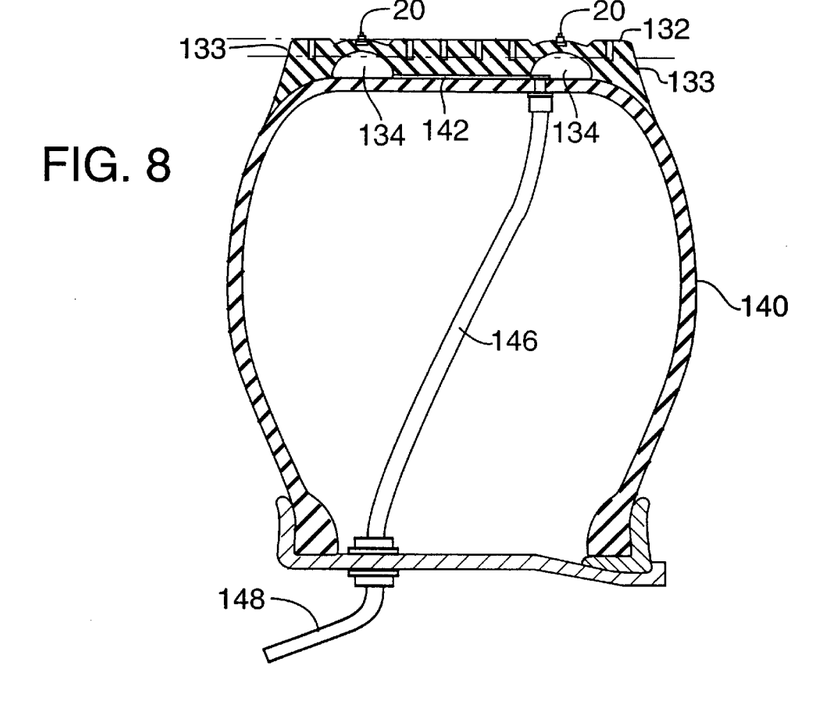

FIGS. 7 and 8 are similar to the traction devices of FIGS. 5 and 6 except that the chambers 134 are joined by a duct 142 provided in the tread 132 of the wheel 140. Preferably multiple ducts 142 are provided at spaced intervals along the length of the chambers 134. As shown in FIGS. 7 and 8, a single hose 146 is coupled to one of the chambers 134 and is connected to a valve stem 148. The chambers 134 are shown in the expanded state in FIG. 8 and are expanded by the application of air pressure. FIG. 7 illustrates the chambers 134 in the contracted or collapsed state and the chamber 134 is collapsed by releasing the air applied to the chamber 134.

Figure 9:
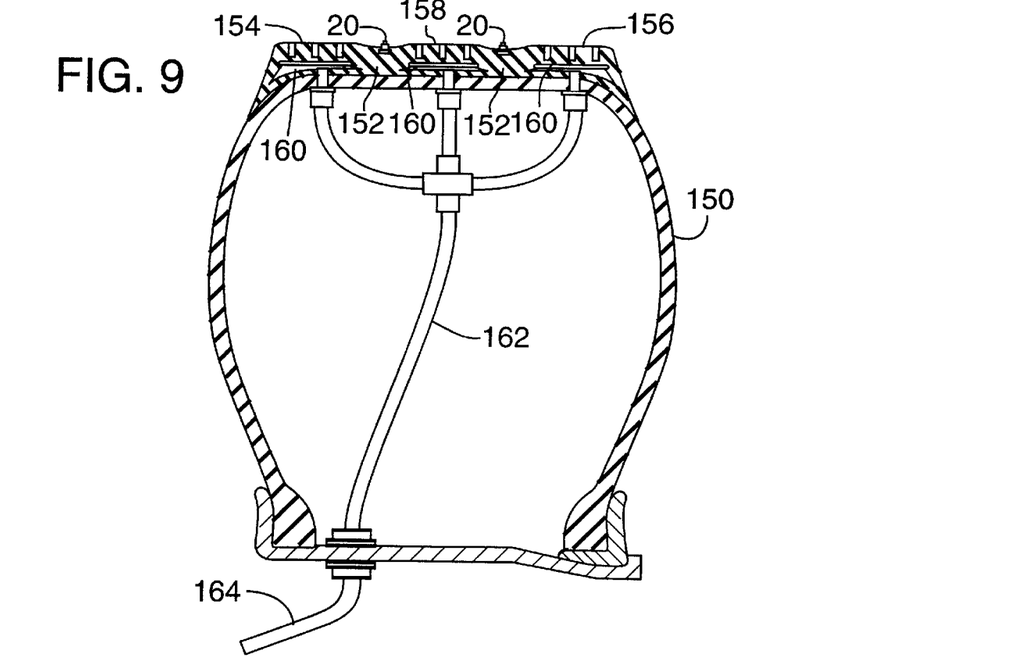
FIGS. 9 and 10 are views of another embodiment of a traction device applied to a single wheel.
Figure 10:
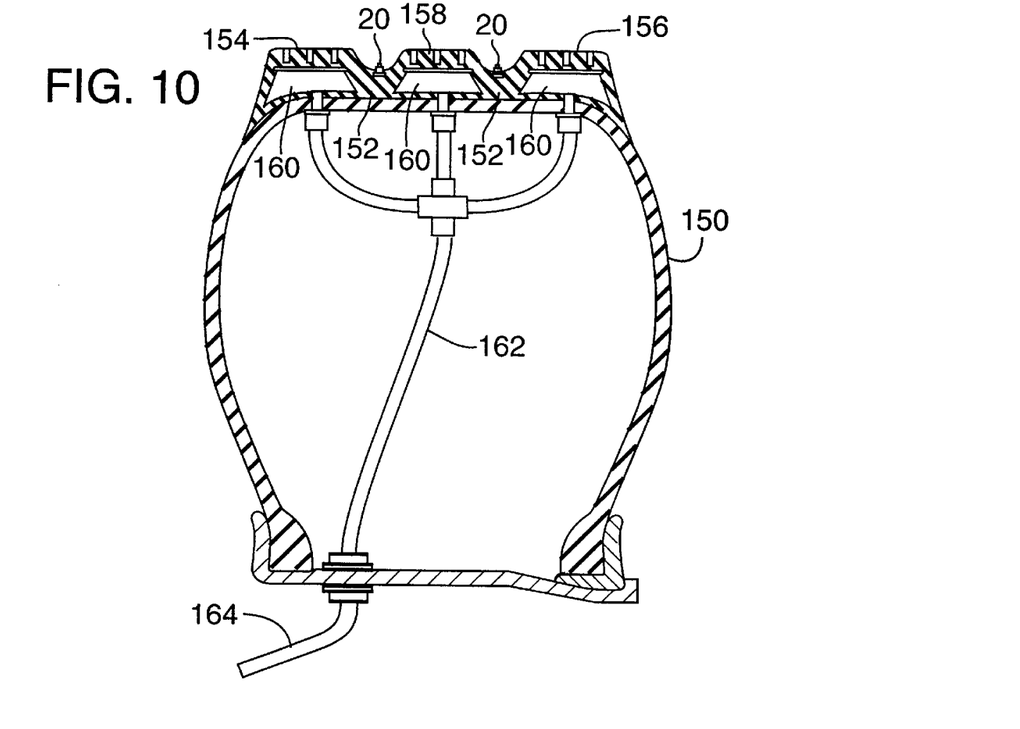

FIGS. 9 and 10 illustrate another traction device applied to a wheel 150. In this embodiment, studs 20 are provided at spaced intervals in two rows around the periphery of the wheel 150. The studs 20 project from a tread portion 152 of the wheel 150. The wheel 150 has side tread sections 154 and 156 and a center tread section 158. Each of the tread sections 154, 156 and 158 have a chamber 160 that is expandable and contractible. A hose 162 connects the chambers 160 to a valve stem 164. The chambers 160 are collapsible as illustrated in FIG. 9 to place the studs 20 in contact with the road surface. The chambers 160 are expandable as shown in FIG. 10 with the tread sections 154, 156 and 158 being expanded beyond the height of the studs 20 to thus keep the studs 20 out of contact with the road surface.

Figure 11:
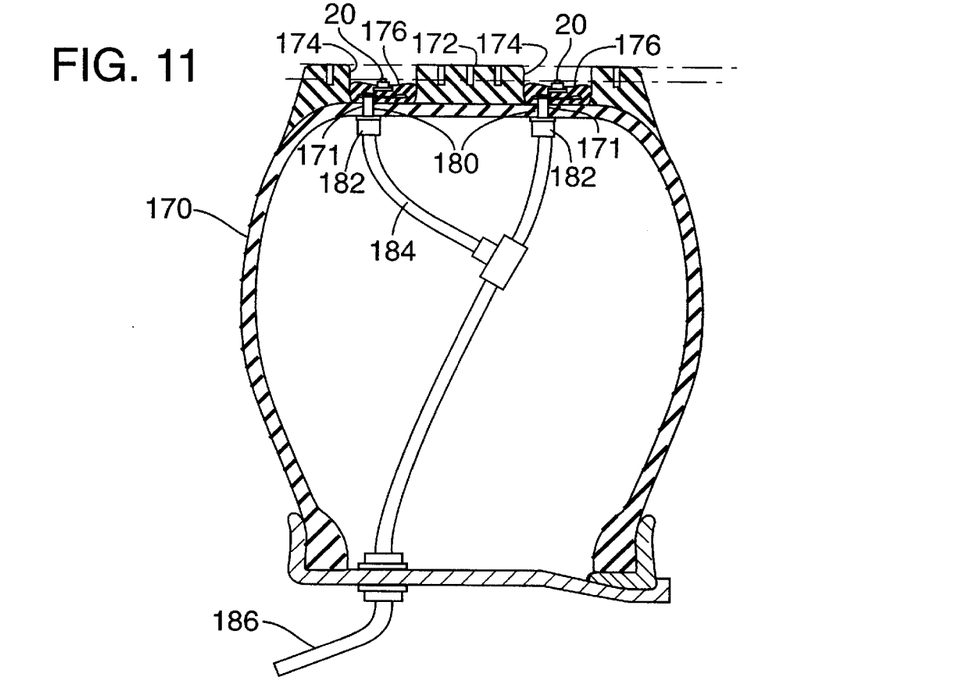
FIGS. 11–17 illustrate a wheel having a replaceable tread portion.
Figure 12:
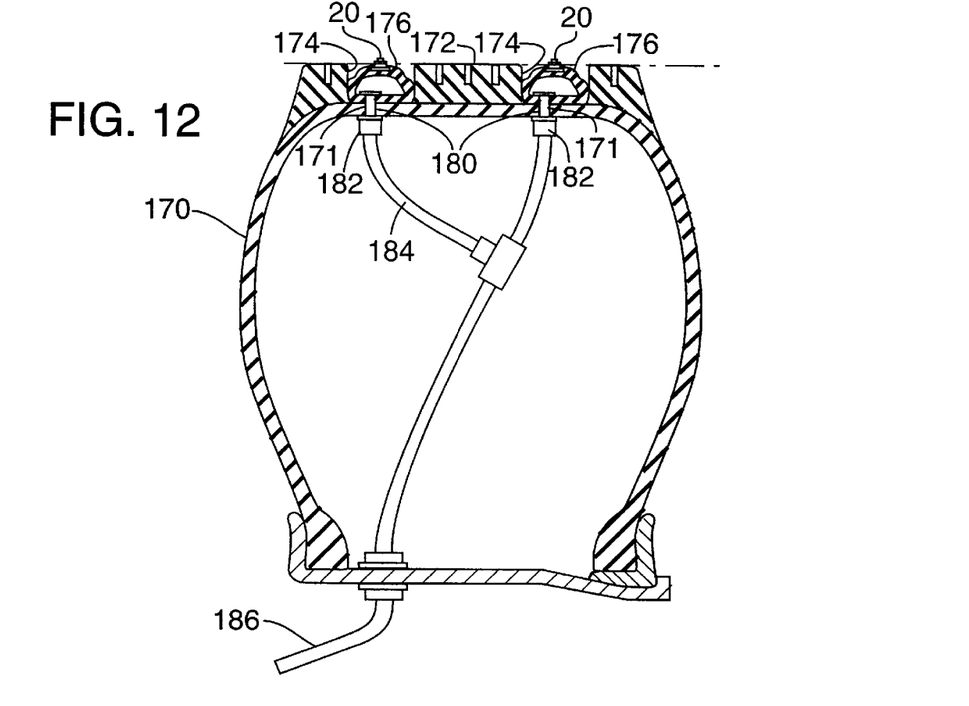
Figure 16:
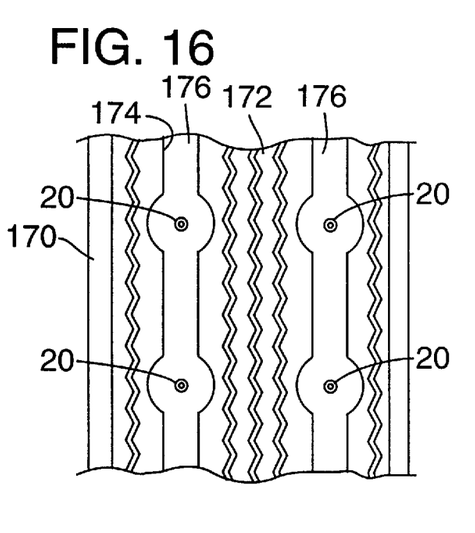

FIGS. 11 and 12 illustrate a traction device as applied to a single wheel 170. In this embodiment, the wheel 170 has a tread 172. The tread 172 has channels 174 formed (see FIGS. 16 and 17) around its periphery with the channels 174 being of a depth to receive replaceable tubular section 176. The tubular section 176 is provided with studs 20. The tubular section 176 is removably mounted in the channels 174 provided in the tire tread 172. The profile of the channels 174 in the tread 172 will have a profile that matches the profile of the tubular section 176 (see FIG. 16). The tubular section has sufficient elasticity such that they may be installed and removed on the wheel 170 as required. The tubular section 176 with studs 20 would be installed on the wheel 170 when additional traction is required such as in ice or snowy conditions and the studs 20 will provide the added traction required. Each tubular portion 176 is inflatable (expandable) by pressurized air and as shown in FIGS. 11, 12, the tubular portion 176 has a stem 180 that extends through an aperture 171 into the cavity portion of the wheel 170. A coupler 182 connects the stems 180 to an air line 184. Air line 184 is connected to a conventional valve stem 186 for inflating and deflating the tubular portion 176. The tubular portion 176 is contractible by releasing the pressurized air.

The tubular portion 176 is inflated by pressurized air so that the tubular portion 176 will be substantially even with the tread 172 of the wheel 170. When the tubular portion 176 is inflated to be even with the tread 172, the studs 20 will project beyond the tread 172 and the studs 20 of the tubular portion 176 thus will be in contact with the ground surface to provide additional traction.

Figure 13:
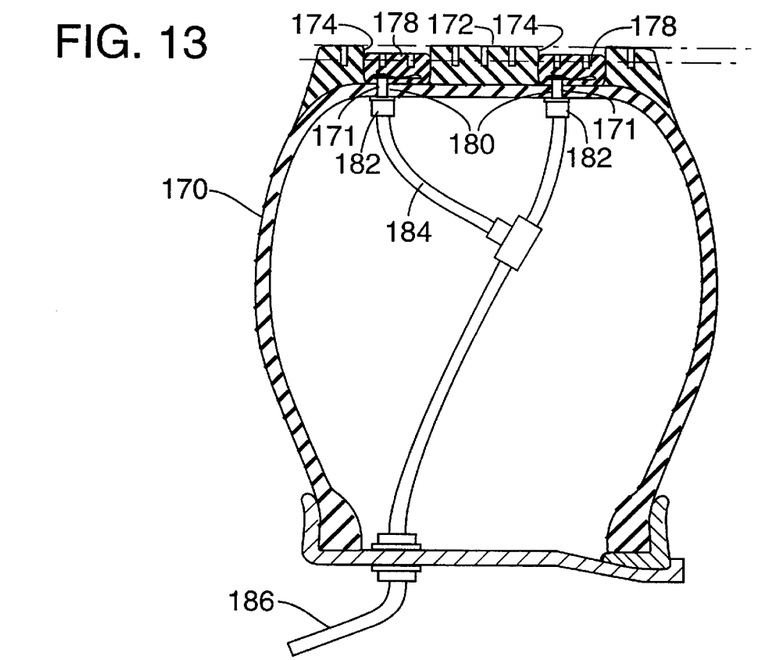
Figure 14:
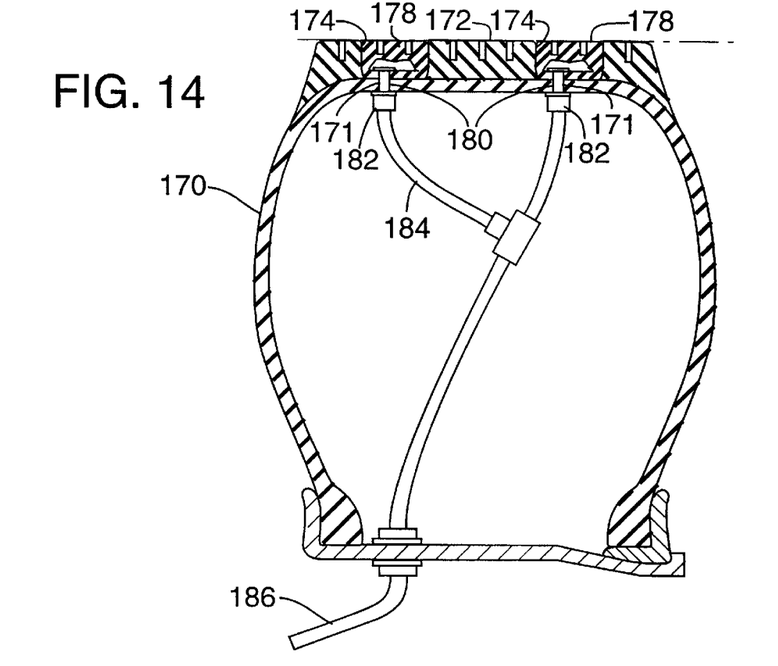
Figure 17:
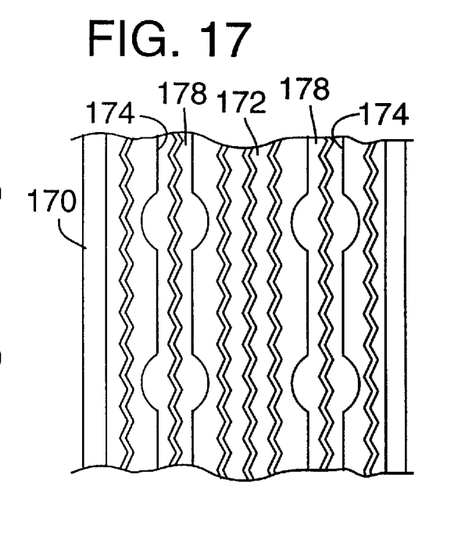

Tubular portion 178, as illustrated in FIGS. 13 and 14, is a filler unit that is most often utilized when additional traction afforded by the studs 20 is not required such as during the summer months. The tubular portion 178 when inflated (FIG. 14) will have its upper surface substantially even with the tread 172 of the wheel 170. The tubular portion 178 has a profile that will mate with the profile of the channel 174 (FIG. 17). The tubular portion 178 has a stem 180 that extends through the aperture 171 into the cavity portion of the wheel 170. A coupler 182 connects the stem 184 to an air line 184. Air line 184 is connected to a conventional valve stem 186 for inflating and deflating the tubular portion 178.

Figure 15:
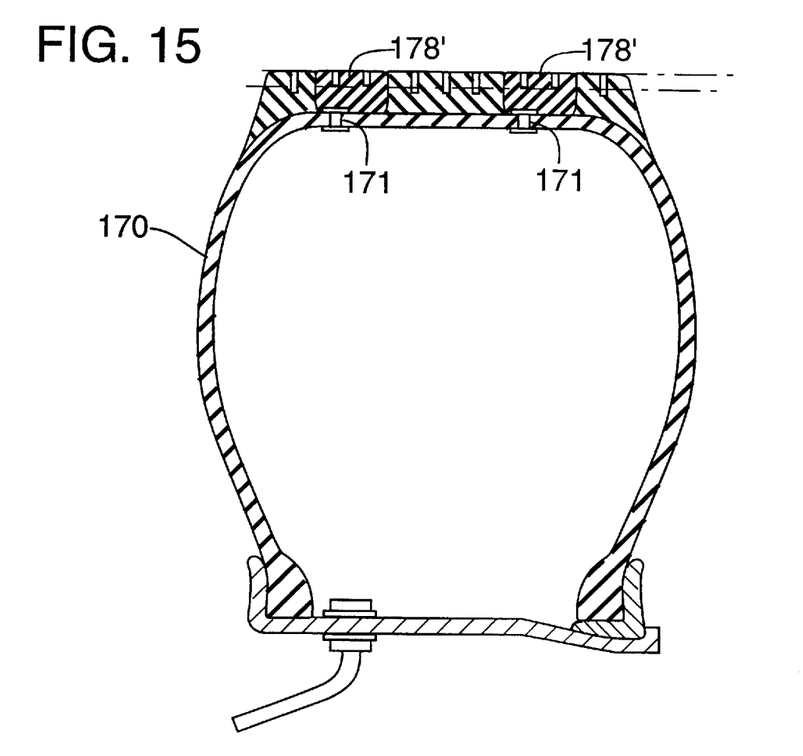

FIG. 15 illustrates a tubular portion 178' that is removably mounted in the channel 174 of the wheel 170. The tubular portion 178' has a stem 181 that fits in the aperture 171 to provide a seal for the cavity of the wheel 170. The tubular portion 178' has sufficient elasticity to permit mounting the tubular portion 178' in the channel 174 formed in the tread 172. It will be appreciated that the tubular portions 178' may also be provided with studs 20.

Those skilled in the art will recognize that modifications and variations may be made without departing from the true spirit and scope of the invention. The invention is therefore not to be limited to the embodiments described and illustrated by is to be determined from the appended claims.

I claim:
1. A wheel for mounting to a vehicle comprising:
a wheel hub and a tire mounted on the wheel hub, said tire having a primary chamber that is inflatable and in the inflated condition defines a circumferential portion for contacting a road surface;
at least two non-stud bearing tread segments in spaced apart relation provided on said circumferential portion of the tire and at least one stud bearing tread segment interposed between the non-stud bearing tread segments; and a secondary inflatable chamber associated with one of either the non-stud bearing tread segments and the stud bearing tread segment and an inlet control selectively providing the inflation and deflation of the secondary chamber whereby the stud bearing tread segment is placed in contact with the road surface and out of contact with the road surface in response to the inflation and deflation of the secondary inflatable chamber.

2. A wheel as defined in claim 1 wherein the secondary chamber is associated with the stud bearing tread segment and is positioned between the primary chamber when inflated and the stud bearing tread segment whereby inflation of the secondary chamber forces extension of the stud bearing tread segment into contact with the road surface.

3. A wheel as defined in claim 1 wherein the secondary inflatable chamber is positioned between the primary chamber when inflated and the non-stud bearing tread segments whereby inflation of the secondary chamber forces extension of the non-stud bearing tread segments beyond the stud bearing segment to place the stud bearing segment out of contact with the road surface.

4. A wheel as defined in claim 1 wherein the space between the non-stud bearing segments is a cavity and the stud bearing tread segment and the secondary expandable chamber are a unit separable from the wheel and mountable in the cavity.

* * * * *